March 16, 1954     R. W. SCOTT     2,672,348
COLLAPSIBLE HAND TRUCK
Filed May 31, 1952                 2 Sheets-Sheet 1
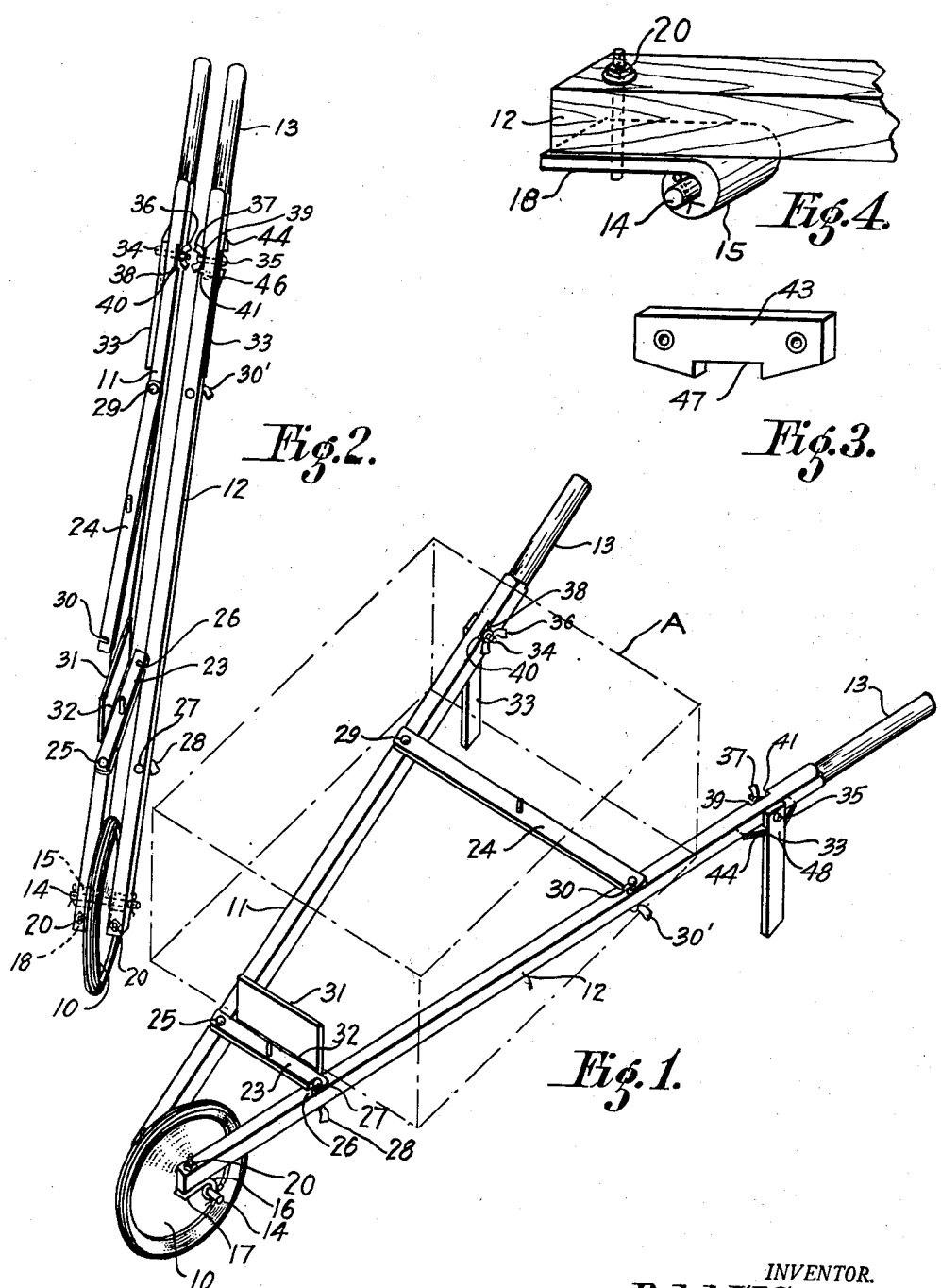
INVENTOR.
Ralph W. Scott
BY Edward C. Healy
ATTORNEY March 16, 1954 R. W. SCOTT 2,672,348
COLLAPSIBLE HAND TRUCK
Filed May 31, 1952 2 Sheets-Sheet 2
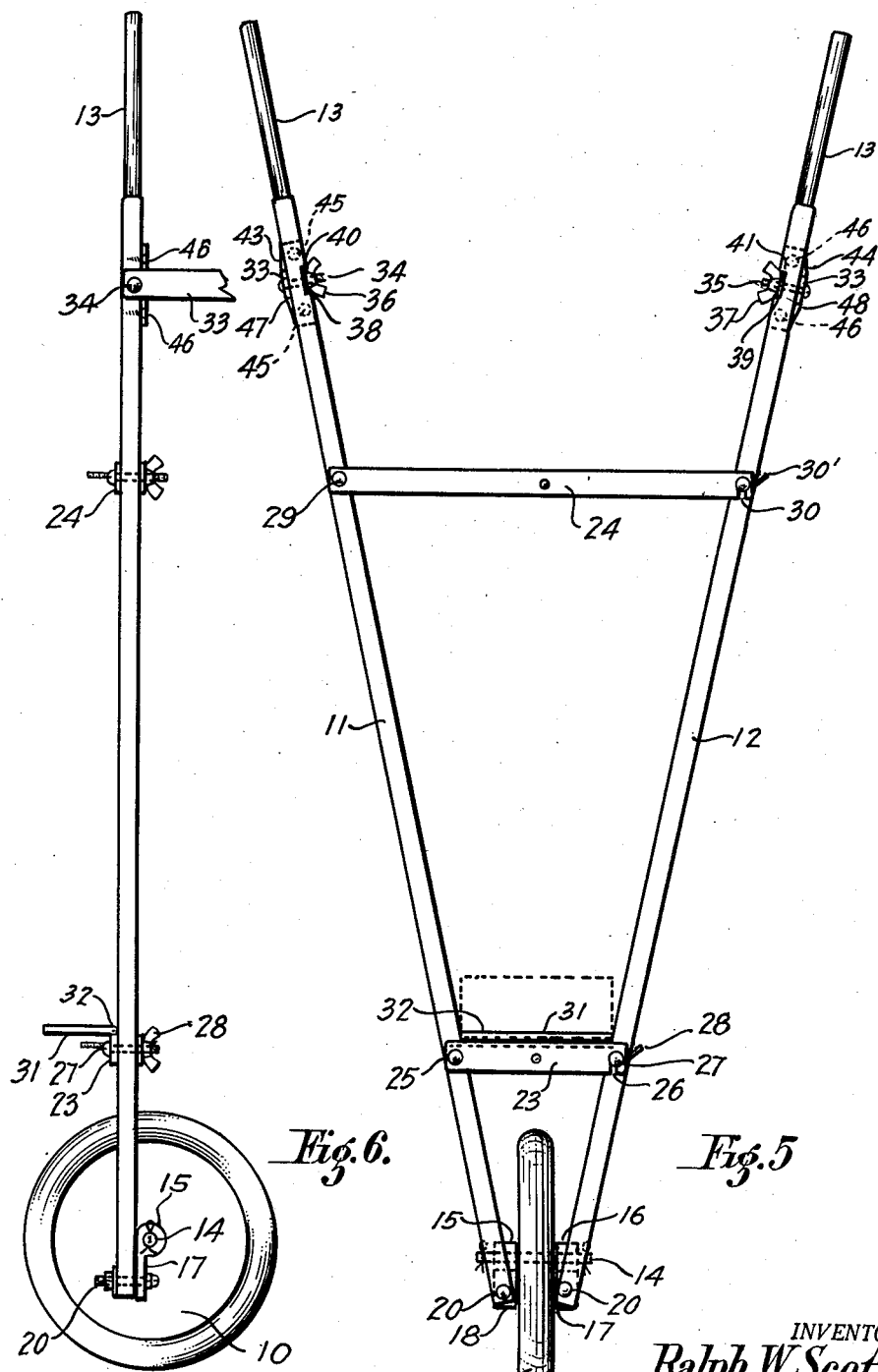
INVENTOR.
Ralph W. Scott
BY Edward C. Healy
ATTORNEY Patented Mar. 16, 1954

2,672,348

UNITED STATES PATENT OFFICE 2,672,348

COLLAPSIBLE HAND TRUCK

Ralph W. Scott, San Mateo, Calif.

Application May 31, 1952, Serial No. 290,973

1 Claim. (Cl. 280—36)

This invention relates to improvements in hand-trucks, and has particular reference to the provision of a specially constructed wheeled frame for carrying boxes, baskets and miscellaneous types of articles.

The principal object of the invention is the provision of adjustable means of retaining the truck in an operative position for carrying miscellaneous loads and for readily collapsing the frame of the truck, whereby the device may be manually and easily handled and eventually stored for subsequent use.

A further object of the invention is the provision of means for supporting a single push wheel in a manner enabling the truck to be used on an exceptionally small radius and quickly adjusted to different turning positions.

Another object of the present invention is the provision of a pair of oppositely disposed bearings and to pivotally secure the same to the lower ends of the frame member.

A still further object of the invention is to secure the bars of the frame member, one to the other, by pivotally mounted cross braces or strips, and also to provide adjustable legs on the side portions of the frame member.

A still further object of the present invention is the provision of a hand-truck that is simple in construction, economical to manufacture, strong, durable, convenient to handle and highly efficient and serviceable in use.

Other objects and advantages will be apparent during the course of the following description:

In the accompanying drawing, forming a part of the description, wherein for the purpose of illustration like numerals designate like parts throughout the same, Fig. 1 is a perspective view of the improved truck and illustrating the same in its open carrying position, Fig. 2 is a top plan view of the hand-truck showing the same in its collapsed position, Fig. 3 is a perspective view of one of the leg locking plates, employed in the invention, Fig. 4 is a fragmentary perspective view of one of the bars and its pivoted extension plate, Fig. 5 is a top plan view of the hand-truck, Fig. 6 is a side elevational view of the same.

Referring in detail to the drawing and the numerals thereof, the numeral 10 indicates the wheel of the truck and the numerals 11 and 12 indicate, respectively, a pair of oppositely disposed elongated bars that are connected to the wheel and terminate in handles or hand-holds 13.

It will be noted that a suitable shaft 14 extends through the wheel and is revolvably mounted in a pair of oppositely disposed bearings 15 and 16, as illustrated to advantage in Figs. 2 and 5, which bearings are formed with flat extensions 17 and 18 that are secured to the outer front portions of the said bars by conventional fastening means 20.

To retain the bars 11 and 12 in an extended or operative position, I employ a short cross strap or brace 23, adjacent to the front of the frame and an elongated cross strap or brace 24 in proximity to the hand-holds 13. It will be noted that the cross strap 23 is pivotally secured as at 25 to the bar 11 and further that the opposite end of said cross bar is notched as at 26 and is adapted to receive therein, for detachable locking engagement, a headed bolt 27 that is secured by a wing nut 28 to the bar 12. It will be further noted that the elongated brace or strap 24 is pivotally secured as at 29 to the bar 12, and is equipped with a notch 30 at its opposite end, whereby the notched end is detachably secured to the bar 12 through the medium of a pin and wing nut 30'.

The upwardly extending portion 31 of the said strap 23 is hingedly secured thereto as at 32 and will support the package 24 and prevent the same from sliding downwardly on the truck and against the wheel 10.

A pair of legs 33 are provided on the side faces of the handles 11 and 12 and are adjustably secured thereto by suitable bolts 34 and 35 carrying conventional wing nuts 36 and 37, respectively. Standard lock washers 38 and 39 are provided, accommodating the said wing nuts. The inner side faces of the said handles are recessed as at 40 and 41 to provide space for enabling the washers 38 and 39 to extend in the handles. A pair of metal plates 43 and 44 are positioned on the lower faces of the handles 11 and 12 and are secured thereto by screws 45 and 46. The outer edges of the said plates are recessed as at 47 and 48 for receiving the said legs 33 and for locking the same when it is desired to support the truck in a substantially horizontal position.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A collapsible hand truck embodying in its construction a pair of elongated bars equipped with hand holds at their outer ends, a wheel interposed between the bars at their inner ends, a shaft extending through said wheel, a bearing pivotally secured on each bar for supporting said shaft, a cross brace positioned in proximity to said wheel and pivotally secured to one of said bars and detachably secured to the other of said bars, a back hingedly secured to said brace and capable of movement in a vertical plane for supporting a package between and on said bars and to prevent downward movement of the package when said truck is wheeled, a second brace of a greater length than the first mentioned brace and spaced therefrom, said braces cooperating with said bars to define a substantially triangular frame, and legs pivotally connected to said bars adjacent to the hand holds thereof.

RALPH W. SCOTT.

References Cited in the file of this patent

UNITED STATES PATENTS

| Number | Name | Date |
| --- | --- | --- |
| 779,124 | Haffey | Jan. 3, 1905 |
| 2,471,462 | Toth | May 31, 1949 |
| 2,494,199 | Provitola et al. | Jan. 10, 1950 |
| 2,602,675 | Forman | July 8, 1952 |